(12) United States Patent
Herbrechtsmeier et al.

(10) Patent No.: US 6,627,124 B1
(45) Date of Patent: Sep. 30, 2003

(54) SINGLE MOULD ALIGNMENT

(75) Inventors: Peter Herbrechtsmeier, Atlanta, GA (US); Peter Hagmann, Erlenbach am Main (DE); Roger Biel, Frankfurt am Main (DE); Axel Heinrich, Duluth, GA (US); Wilhelm Hörner, Sulzbach (DE); Egbert Jux, Mainaschaff (DE); Anette Therese Lang-Schöll, Grossostheim (DE); Iris Jlona Leder-Brück, Niedernberg (DE); Achim Müller, Grossostheim (DE); Bernhard Seiferling, Goldbach (DE); Werner Steffan, Eichenbühl (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/530,073

(22) PCT Filed: Oct. 19, 1998

(86) PCT No.: PCT/EP98/06611

§ 371 (c)(1),
(2), (4) Date: Dec. 14, 2000

(87) PCT Pub. No.: WO99/20455

PCT Pub. Date: Apr. 29, 1999

(30) Foreign Application Priority Data

Oct. 21, 1997 (EP) .............................. 97118252

(51) Int. Cl.⁷ .............................................. B29D 11/00
(52) U.S. Cl. ..................... 264/1.36; 264/1.1; 264/1.38; 264/2.6; 264/39; 425/174.4; 425/808
(58) Field of Search .................. 264/1.1, 1.36, 264/1.38, 2.6, 39; 425/808, 174.2, 174.4, 352, 346, 347

(56) References Cited

U.S. PATENT DOCUMENTS 4,166,088 A    8/1979   Neefe ............................ 264/1
4,197,266 A *  4/1980   Clark et al. .................. 425/808
4,402,659 A    9/1983   Greenbaum .................. 425/233
4,786,444 A   11/1988   Hwang ........................ 264/1.4
4,955,580 A    9/1990   Seden et al. .................. 249/82
5,080,839 A *  1/1992   Kindt-Larsen .............. 264/2.6
6,113,817 A *  9/2000   Herbrechtsmeier et al. ...... 264/1.36

FOREIGN PATENT DOCUMENTS

| DE | 27 24 002 A2 | 5/1977 |
| DE | 196 10 563 A2 | 3/1996 |
| EP | 0 183 324 | 11/1985 |
| EP | 0 318 164 A2 | 10/1988 |
| EP | 0 367 513 A2 | 10/1989 |
| EP | 0 453 231 A2 | 4/1991 |
| EP | 0 645 235 A2 | 4/1991 |
| EP | 0 472 303 A2 | 7/1991 |
| EP | 0 637 490 A1 | 7/1994 |
| EP | 0 686 488 A2 | 6/1995 |
| EP | 0 686 491 A2 | 6/1995 |
| GB | 650 692 | 6/1947 |
| GB | 1 092 749 | 12/1964 |
| GB | 1 516 194 | 7/1975 |

OTHER PUBLICATIONS

PCT Search Report.

* cited by examiner

Primary Examiner—Mathieu D. Vargot
(74) Attorney, Agent, or Firm—Jian S. Zhou; Richard I. Gearhart; R. Scott Meece

(57) ABSTRACT

The invention tackles the problem of improving the production process for contact lenses further, so that the production costs for contact lenses can be reduced further and the production capacities can be increased. To this end, provision is made for the two mould halves, which together form the mould for producing a contact lens, to be fixed to each other and/or detachably connected to each other by means of individual half-mould guide. In conjunction with a cyclic production process, a high degree of automation can be achieved in this way.

44 Claims, 5 Drawing Sheets

Fig. 9

SINGLE MOULD ALIGNMENT

The invention relates to a process for producing mouldings, especially optical lenses and specifically contact lenses, to a device for carrying out the process and to mouldings produced by the process or by means of the device, especially optical lenses and specifically contact lenses, according to the preamble of the respectively-independent patent claim.

Contact lenses, which it is intended to produce economically in large numbers, are preferably produced by the so-called mould or full-mould process. In this process, the lenses are produced in their final shape between two mould halves (moulds), so that neither subsequent machining of the surfaces of the lenses nor machining of the rim is necessary. Mould processes are described, for example in PCT-patent application WO 87/04390 or in EP-A 0 367 513.

Contact lenses produced in this way are mouldings of very low mechanical stability having a water content of more than 60% by weight. After their production, the lenses are further inspected by measurement, are then packed and subjected to heat sterilization at 121° C. in an autoclave.

In the case of these known mould processes, the geometry of the contact lens to be produced is defined by the mould cavity. The rim of the contact lens is likewise formed by the mould, which usually consists of two mould halves. The geometry of the rim is defined by the contour of the two mould halves in the region in which they touch each other.

In order to produce a contact lens, first of all a specific amount of the flowable starting material is introduced into the female mould half. The mould is then closed by putting the male form half into place. The starting material is usually dispensed somewhat to excess, so that when the mould is closed, the excess quantity is expelled into an overflow space that adjoins the mould cavity on the outside. The subsequent polymerization or crosslinking of the starting material is carried out by means of irradiation with UV light or by the action of heat or another non-thermal method. In the process, both the starting material in the mould cavity and the excess material in the overflow space are hardened. In order to obtain fault-free separation of the contact lens from the excess material, good sealing or expulsion of the excess material must be achieved in the zone in which the two mould halves touch. Only in this way is it possible for fault-free contact lens rims to be obtained.

The materials used for these moulds are preferably plastics, such as polypropylene. The moulds are produced by injection moulding and used only once. The reason for this is, inter alia, that the moulds are to a certain extent contaminated by the excess material, are damaged when the contact lens is separated or are irreversibly deformed in subareas during the sealing of the mould.

In the case of the injection-moulded forms, fluctuations in the dimensions as a result of fluctuations in the production process (temperatures, pressures, material properties) also have to be expected. Furthermore, it is also possible for shrinkage of the moulds after the injection moulding to occur. These dimensional changes in the mould may lead to fluctuations in the parameters of the contact lens to be produced (peak refractive index, diameter, basic curve, central thickness etc.), as a result of which the quality of the lens is diminished, and hence the yield is reduced. Moreover, in the event of insufficient sealing between the two mould halves, the excess material is not separated cleanly, so that so-called webs are formed on the rim of the contact lens. If it is more pronounced, this cosmetic fault at the rim of the lens can also lead to irritation when such a lens is worn, for which reason such lenses have to be sorted out by means of an inspection.

In particular because of the requirements on the quality of the rim of the contact lens, the moulds are also used only once, since a certain deformation of the moulds in their marginal region cannot be ruled out with certainty.

U.S. Pat. No. 5,508,317 describes a new contact lens material which represents an important improvement in the chemistry of polymerizable starting materials for the production of contact lenses. The patent discloses a water-soluble composition of a prepolymer, which is put into the mould cavity and subsequently crosslinked photochemically. Since the prepolymer carries a plurality of crosslinkable groups, the crosslinking is distinguished by high quality, so that a finished lens of optical quality can be produced within a few seconds, without subsequent extraction or reworking steps being necessary. The improved chemistry of the starting material presented in the patent means that contact lenses can be produced at considerably lower costs, so that this makes the production of disposable wearable lenses possible.

EP-A-0 637 490 describes a process by means of which a further improvement in the production process of contact lenses using the prepolymer described in U.S. Pat. No. 5,508,317 can be achieved. In this case, the material is put into a mould consisting of two halves, the two mould halves not touching each other but having a thin gap of annular design arranged between them. The gap is connected to the mould cavity, so that excess lens material can flow away into the gap. Instead of polypropylene moulds that can be used only once, it is possible for reusable quartz/glass moulds to be used, since, following the production of a lens, these moulds can be cleaned rapidly and effectively off the uncrosslinked prepolymer and other residues, using water, on account of the water-soluble basic chemistry, and can be dried with air. By this means, high precision lens shaping can in particular also be achieved. The crosslinking of the prepolymer is carried out by means of irradiation, especially with UV light, the irradiation of the mould cavity being limited by means of a chromium mask. Thus, only the material which is in the mould cavity is crosslinked, so that high reproducibility of the rim shaping of the lens can be achieved without a positive connection between the two mould halves made of polypropylene. The uncrosslinked, shadowed prepolymer solution can easily be washed away from the dimensionally stable, crosslinked lens by using water.

The invention tackles the problem of improving the production process for contact lenses further, so that the production costs for contact lenses can be reduced further, and the production capacities can be increased, and, at the same time, high reproducibility of the lens parameters is provided. In particular, the production time should be shortened and a higher degree of automation should be achieved. The number of moulds which have to be exchanged should be as low as possible.

By means of the single mould-half alignment of the female and of the male mould halves of the mould, in conjunction with a production process that is carried out cyclically, it is possible for a higher degree of automation to be achieved. Single mould-half alignment enables all the necessary centring and adjusting elements to be fitted directly to the mould, and thus the mould halves are easily accessible to an automatic handling system. This means that the entire production of a contact lens can be automated within a cyclic process, as a result of which the production costs can be reduced drastically and, at the same time, the productivity of a production plant can be increased. Furthermore, by eliminating manual process steps, high reproducibility of the contact lenses produced is ensured, so that fluctuations in the quality of the individual lenses are largely ruled out.

Moreover, single mould-half alignment enables automation of the mounting of mould halves, the changing of mould halves and the cleaning of mould halves.

In particular, the rapid changing of a mould within a cyclic production process is made possible by single mould-half alignment, since the outlay for the adjustment is dispensed with.

Furthermore, in the case of single mould-half alignment, the identification of individual mould halves is also possible, i.e. even in the case of combining a plurality of individual moulds to form a unit, "chaotic" production is possible, since the respective dioptric power can be registered via a mould-half identification, and hence the correct packaging of the lenses can be ensured. For instance, in the case of n-parallel individual moulds, n different dioptric powers can be produced at the same time. If a number m of dioptric powers is no longer needed, then it is necessary only for the female individual mould halves to be exchanged and replaced by others.

Furthermore, as a result of combining a plurality of individual moulds to form modularly constructed units consisting of m or n moulds, flexible adaptation to various production capacities is possible.

Further details and advantages of the invention emerge from the following description and the drawing, in which.

Figure 1:
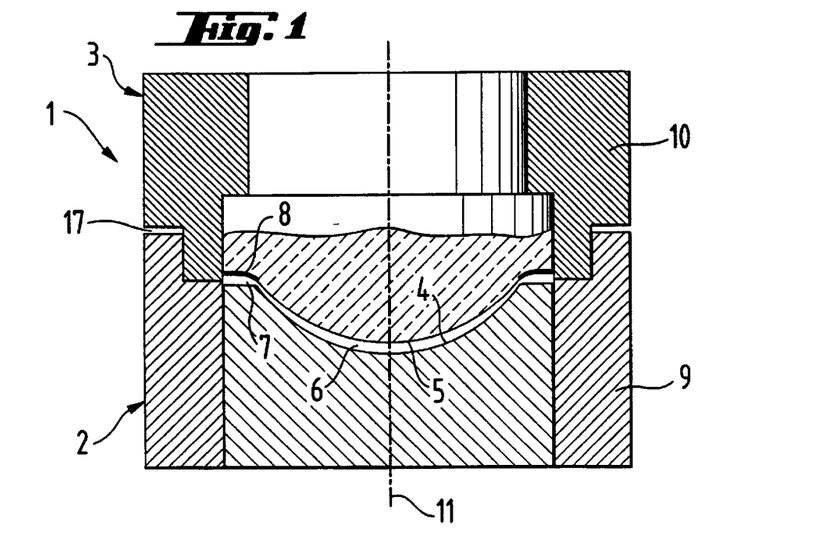
FIG. 1 shows a section through a first exemplary embodiment of a mould according to the invention for the inventive process, in the closed position.
Figure 2:
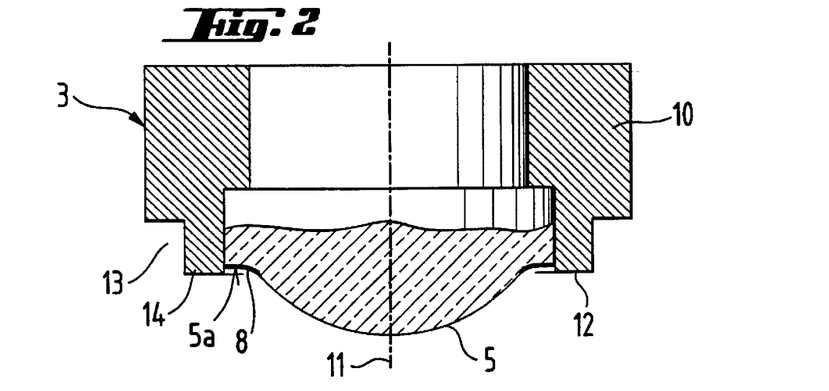
FIG. 2 shows a section through the male mould half of the mould from FIG. 1.
Figure 3:
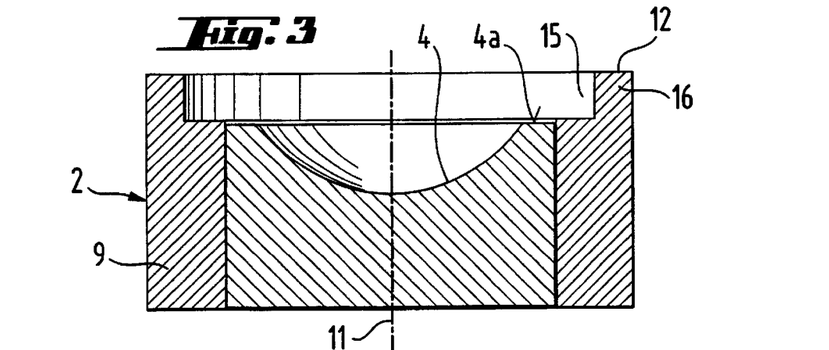
FIG. 3 shows a section through the female mould half of the mould from FIG. 1.

The mould, designated generally by 1 in FIG. 1, for the production of a contact lens, from a liquid starting material which can be polymerized or crosslinked by UV radiation, comprises a female mould half 2 and a male mould half 3, each of which has a curved mould surface 4 and 5, respectively which together define a mould cavity 6 which, for its part, in turn determines the shape of the contact lens to be produced. The male mould half 3, illustrated specifically in FIG. 2, has a convex outer surface 5, whose shaping defines the inner contour of the contact lens to be produced, while the female mould half 2, illustrated in FIG. 3, is provided with a concave outer surface 4, which determines the outer contour of the contact lens to be produced.

In the exemplary embodiment illustrated in FIG. 1, the mould cavity 6 is not sealed off completely and tightly, but is open circumferentially in the region of its circumferential edge, which defines the rim of the contact lens to be produced, and is connected there to a relatively narrow annular gap 7, which can be designed to be continuous or else of segment shape. The annular gap 7 is bounded and formed by a mould wall 4a and 5a on the female and, respectively, on the male mould halves 2, 3. However, within the context of the invention, it is also conceivable to design the individual mould halves 2, 3 in such a way that they touch each other adjacent to the mould cavity 6, and the mould cavity 6 is thus tightly sealed by the bounding walls of the two individual mould halves 2, 3.

The two mould halves 2 and 3 consist of a material that is as transparent as possible to the selected energy form, especially UV light, for example of a polypropylene that is usually used for such purposes or another polyolefin. Since the irradiation with UV light is carried out only on one side here, specifically expediently from above through the male mould half 3, it is only the latter which advantageously needs to be transparent to UV. This is correspondingly true for irradiation through the female mould half 2.

In particular, it is advantageous for at least the half of the mould that is irradiated with UV light to consist of quartz. This material is distinguished not only by an especially good UV transparency, but is in addition also very hard and resistant, so that moulds produced from this material can be reused very well. However, the precondition for this, as emerges still further from the following text, is that the mould is closed either without force or incompletely, so that the mould halves are not damaged by contact. As an alternative to quartz, it is also possible for UV-transparent special glasses or sapphire to be used. Because of the reusability of the mould halves, a relatively high outlay can be expended at the time of their production in order to obtain moulds of extremely high precision and reproducibility. Since the mould halves do not touch each other in the region of the lens to be produced, i.e. the cavity or actual mould faces, damage as a result of contact is ruled out. This ensures a high service life of the moulds, which, in particular, also ensures high reproducibility of the contact lenses to be produced.

In the event of applying energy on one side, it is in principle possible for the mould half facing away from the energy source to be produced from any material which withstands the crosslinkable material or components thereof. If metals are used, however, potential reflections are to be expected, depending on the type of energetic radiation, and these may possibly lead to undesired effects such as over exposure, edge distortion or the like. Absorbent materials do not have these disadvantages.

The application of the energy effecting the crosslinking to the material from which the contact lens is produced is restricted to the mould cavity 6, i.e. it is only the crosslinkable material in the mould cavity 6 that has the suitable form of energy, especially UV radiation, applied to it, and only the material in the cavity 6 is crosslinked. In particular, the material in the annular gap 7 surrounding the mould cavity 6 is not crosslinked. For this purpose, the mould face 5 of the male mould half 3 is advantageously provided in the region of its mould wall 5a with a mask 8 that is non-transparent to UV light, this mask extending as far as directly alongside the mould cavity 6 and, with the exception of the latter, preferably shielding from the irradiated energy all the remaining parts, cavities or surfaces of the mould which are in contact or can come into contact with the uncrosslinked, possibly excess material, which is liquid here. Thus, subareas of the rim of the lens are formed by physically limiting the radiation or other forms of energy initiating the polymerization or crosslinking, rather than by limiting the material by means of mould walls.

In the case of UV light, the mask 8 may, in particular, be a thin chromium layer which is produced, for example, by a process such as is known, for example, in photolithography or UV lithography. The mask material considered can, if desired, also be other metals or metal oxides. The mask may also be covered with a protective layer, for example with silicon oxide. The mask is advantageously arranged in a fixed position since this simplifies the automation. However, it is also possible to use a separately designed mask or screen, which likewise has the effect of limiting the UV radiation onto the mould cavity 6. Furthermore, optical guidance of the beam path outside the mould may be provided, in order to achieve physical limitation of the UV radiation.

The shaping surfaces 4, 5 of the female mould half 2 and of the male mould half 3 are each embedded in a mount 9,10, whose shape is advantageously selected such that simple handling, without additional adjustment work, is made possible. To this end, the mounts 9, 10 have guide surfaces which are aligned towards an optical axis 11 of the respective shaping surface 4, 5. In addition, they also have elements which permit exact positioning of the two mould halves 2, 3 into the axial direction with respect to the optical axis. The elements per se, or in cooperation with other external elements, permit the required simple adjustment when the mould is closed.

It is thus possible for the two mould halves 2,3 to be centred in relation to each other by means of their mounts 9, 10 when they are being joined. The centring accuracy should preferably be better than 5 μm. The axial distance between the two mould halves 2, 3 defines the central thickness of the contact lenses, which is typically around 0,1 mm. This distance should expediently be maintained within the range of ±0.005 mm. Tilting of the two mould halves 2, 3 in relation to each other is to be reduced to a minimum. Given a diameter of the shaping surfaces 4, 5 of about 14 mm, the tilt error in the axial direction should advantageously be less than 5 μm.

For this purpose, the mould halves 2, 3 of a first exemplary embodiment, illustrated in FIGS. 2 and 3, have on their mount 9, 10 mould recesses, which can be inserted with a precise fit into corresponding, complementarily designed projections on the respectively corresponding mould half 2, 3, and together form the guide surfaces of the two mould halves 2 and 3. The centring and guidance of the two mould halves 2, 3 when the mould is being closed is provided by the outer contour, produced with the highest possible precision, of the mould recesses and projections, so that overall simple handling of the closing operation of the mould results from the interengagement of male and female mould halves.

The male mould half 3 illustrated specifically in FIG. 2 has on its outer mount 10, in the region of a dividing surface 12, a recess 13 which is of annular design and exposes a web 14 which encloses the shaping surface 5. When the two mould halves 2, 3 are closed, this web 14 engages in an annular groove 15, which is produced so as to be an accurate fit and annularly encloses the shaping surface 4 of the female mould half 2. The highly precise production of web 14 and groove 15 with respect to their front and outer surfaces, which serve as guide surfaces, permits the adjustment-free centring of the two mould halves 2, 3 in relation to the optical axis 11, and the defining of the axial distance between the two mould halves 2, 3. In order to define the axial distance between the two mould halves 2, 3, it is also possible to use a separate spacer ring, which is preferably inserted into the groove 15. The dimensions of the guide surface of web 14 and groove 15 should not be selected to be too large, in order to avoid tilting of the two mould halves 2, 3 when they are being joined. In order to facilitate the insertion of the web 14 into the groove 15, it is, moreover, also possible to provide the groove 15 with an insertion bevel. In order to permit the two mould halves 2, 3 to be closed without force, no attempt is made to provide accurately fitting seating of the recess 13 with a corresponding mould attachment 16, which adjoins the groove 15 of the female mould half 2. When the mould is closed, there therefore remains a gap 17 between the end surfaces of the mould recess 13 and of the mould attachment 16. In addition to closing the two mould halves as a result of their dead weight, it is also conceivable for the two mould halves to be joined to each other by means of a spring, which permits the largely force-free closure of the two mould halves, so that the guide surfaces are not pressure-loaded during the closing operation.

Furthermore, it is expedient to design the mould recesses in such a way that rotation of the two mould halves 2,3 in relation to each other is possible, since by this means the adhesive forces which are caused by the adhesion of the contact lens to one of the two mould halves 2, 3 and which lie in the range from 60 N to 120 N can be overcome, and thus the forces during the opening of the moulds can be reduced. Overall, the damage to lenses during the separation of the mould halves 2, 3 in order to remove the contact lens can be reduced considerably by this means.

Figure 4:
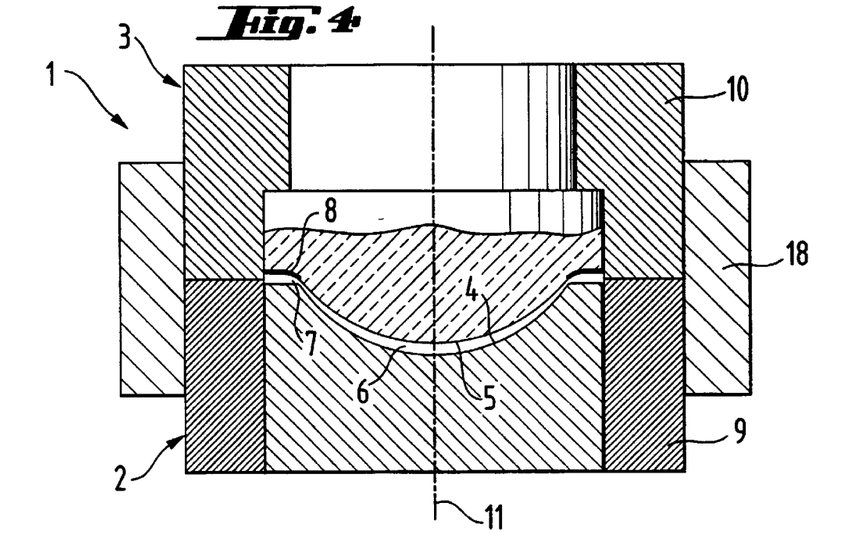
FIG. 4 shows a section through a second exemplary embodiment of a mould according to the invention for the inventive process, in the closed position.
Figure 5:
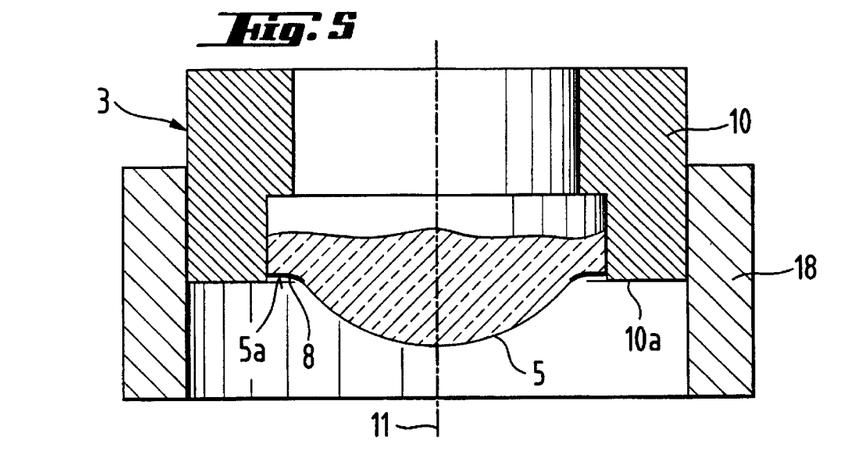
FIG. 5 shows a section through the male mould half of the mould from FIG. 4.
Figure 6:
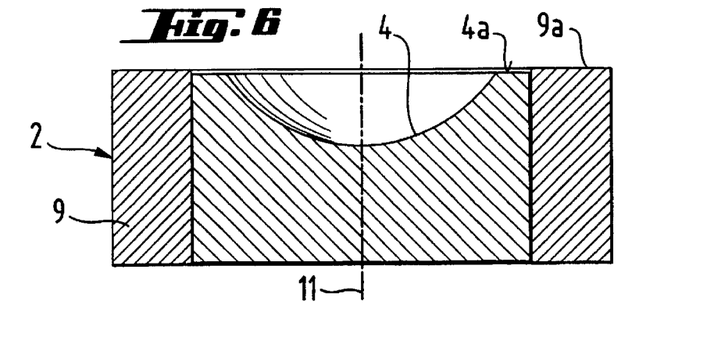
FIG. 6 shows a section through the female mould half of the mould from FIG. 4.

In the case of the second exemplary embodiment of a mould 1, illustrated in FIGS. 4 to 6, a centring device 18, which is of cylindrical design here, is provided to guide the individual mould halves 2, 3. The outer mounts 9, 10 of the female mould half 2 and of the male mould half 3 are designed to be smooth, without inward or outward mouldings, and their outer diameter corresponds to the inner diameter of the centring device 18. When the mould is being closed, the female and the male mould halves 2, 3 are pushed in a sliding manner into the centring device 18. The centring of the two mould halves 2, 3 in relation to each other is provided by the highly precise and exactly fitting production of the outer contour both of the end faces 9a, 10a of the mounts 9, 10 and of the inner contour of the centring device 18, which respectively serve as guide surfaces. Since the two mould halves 2, 3 are joined to each other in a sliding manner, a positive connection of the two mould halves 2, 3 without force is also made possible here. In order to avoid tilting of the two mould halves 2, 3 when they are being inserted into the centring device 18, it is also possible for insertion bevels to be provided, which facilitate the insertion of the mould halves 2, 3 into the centring device 18. Furthermore, it is also possible to connect the centring device 18 firmly to one of the two mould halves 2, 3, so that the positioning of the two mould halves 2, 3 in relation to each other is carried out by means of a positive connection of the centring device 18 to the outer mount 9, 10 of the female or male mould half 2, 3, depending on the mould half 2, 3 to which the centring device 18 is firmly connected. In particular in the case of fitting the centring device 18 to the male mould half 3, it is also made possible to protect the sensitive convex mould surface 5. Provision may also be made to design the centring device 18 as an integral component of one of the two outer mounts 9, 10.

Figure 7:
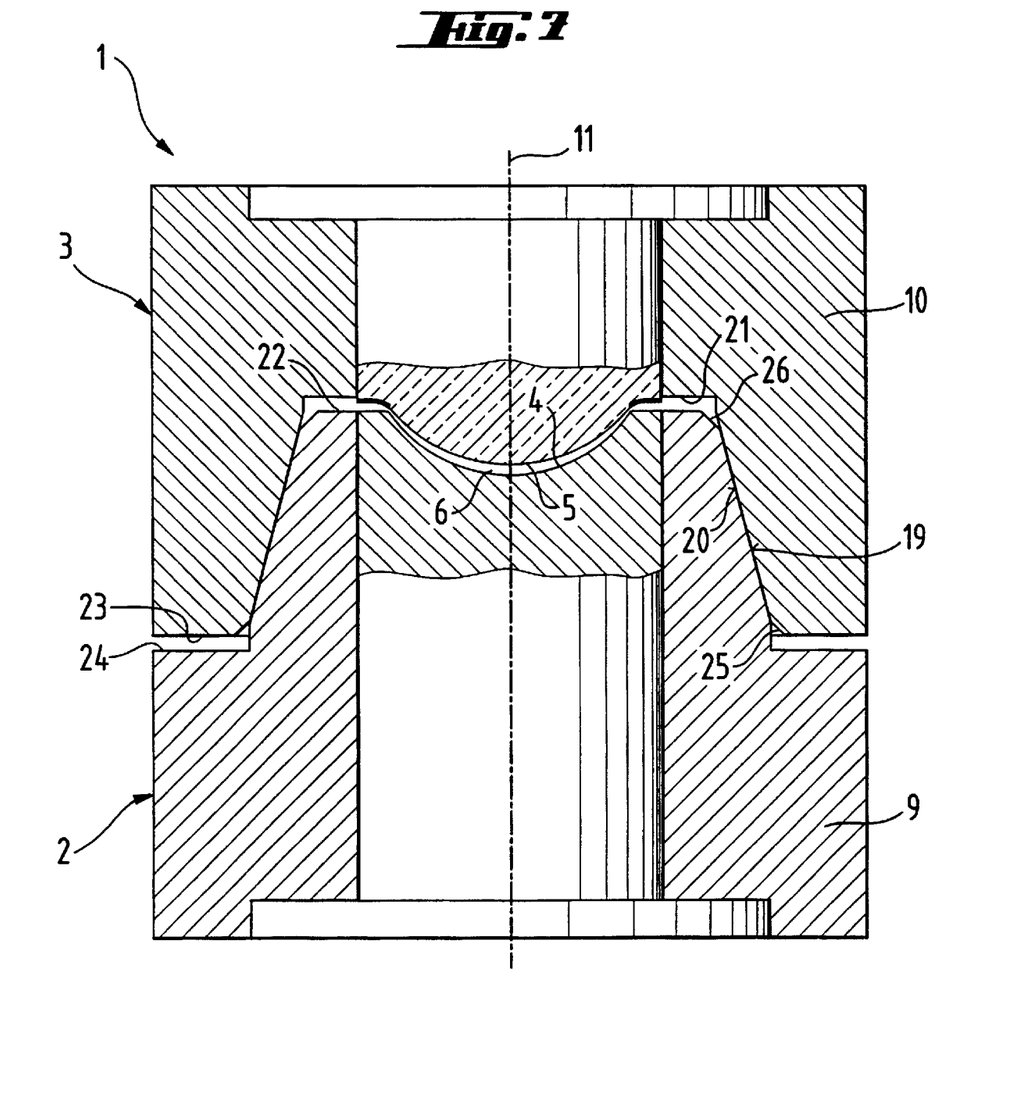
FIG. 7 shows a section through a third exemplary embodiment of a mould according to the invention for the inventive process, in the closed position.

FIG. 7 shows a third exemplary embodiment of a mould 1 comprising the female mould half 2 and the male mould half 3. The mounts 9, 10 of the female mould half 2 and of the male mould half 3 are each of conical design here, the outer contour of the female mount 9 being designed as a truncated cone 19 which tapers conically towards the shaping surface 4 and which engages in a highly precise and accurately fitting manner in the inner contour of the male mount 10, which is designed as a conical funnel 20. Of course, it is also possible within the context of the invention for the mount 10 of the male mould half 3 to be designed as a truncated cone 19 and for the mount 9 of the female mould half 2 to be designed as a funnel 20. The bottom 21 of the funnel 20 is arranged in the region of the shaping surface 5 of the male mould half 3. When the mould is being closed, the male mould 3 is slipped in a sliding manner over the truncated cone 19 of the female mould half 2, the top surface 22 of the truncated cone 19 not touching the funnel bottom 21. No contact between the two mould halves 2, 3 is provided in the region of the closing face of the mount 10, which forms the funnel rim 23, or in the region of the fit-on face 24 of the truncated cone 19. The centring of the two mould halves 2, 3 in relation to each other is provided by the highly precise and accurately fitting production of the outer contour of the truncated cone 19, as well as of the inner contour of the funnel 29, which each serve as guide surfaces. The design of the guide surfaces as conical surfaces enables the adjustment-free centring of the two individual mould halves 2, 3 in relation to each other in the axial direction of the optical axis. The axial distance between the two mould halves 2, 3, by which the central thickness of the contact lens produced is defined, is determined by the position of the shaping surfaces 4, 5 in the mounts 9, 10. The mould surfaces 4, 5 are embedded in an absolutely centred manner into the mounts 9, 10 by means of a device (not illustrated here), so that the desired distance between the shaping surfaces 4, 5 is provided. Since the top surface 22 of the truncated cone does not touch the funnel bottom 21, and the two mounts 9, 10 are joined to each other only via their conical outer surfaces, and are inserted into each other in a sliding manner, a positive connection of the two mould halves 2, 3 without force is made possible. In order to avoid tilting of the two mould halves 2, 3 when the mould is being closed, it is also possible for insertion bevels 25, 26 to be provided, which facilitate the placing of the two mould halves 2, 3 in each other. The centring and guidance of the two mould halves 2, 3 when the mould is being closed is thus provided by the outer contour, produced with extremely high precision, of the truncated cone 19, and the inner contour of the funnel 20, so that, over all, the result is simple handling of the closing operation of the mould as a result of the inter engagement of male and female moulds. Since the conical surfaces 19, 20 of the two mounts 9, 10 are of rotationally symmetrical design, it is also made possible here to rotate the two mould halves 2, 3 in relation to each other when the mould is being opened, by which means the adhesion forces with which the lenses adhere to the mould halves can be overcome more easily, and thus the risk of crack formation in the contact lenses as a result of stressing during the opening operation can be reduced.

Figure 8:
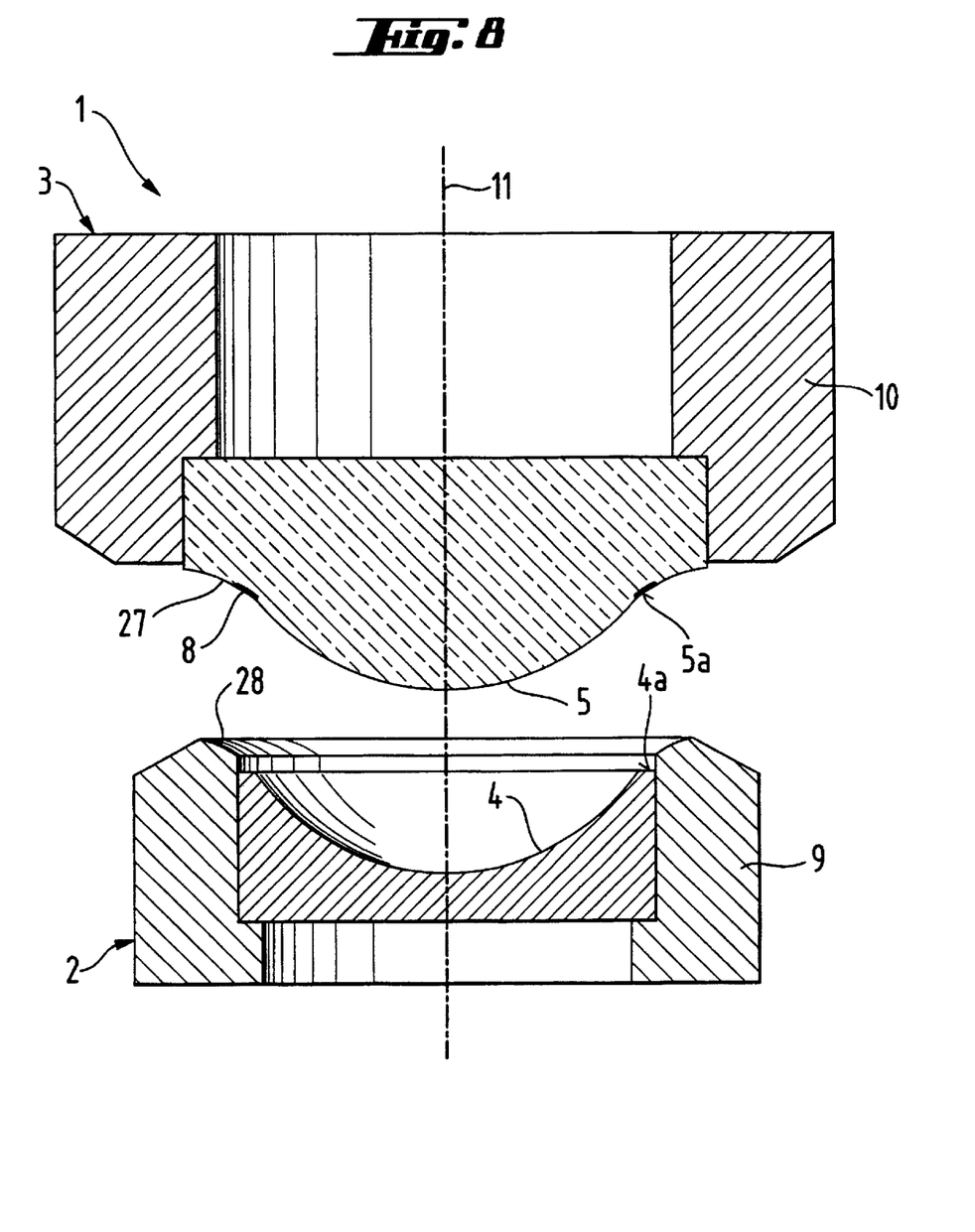
FIG. 8 shows a section through a fourth exemplary embodiment of a mould according to the invention for the inventive process, in the opened position.
Figure 9:
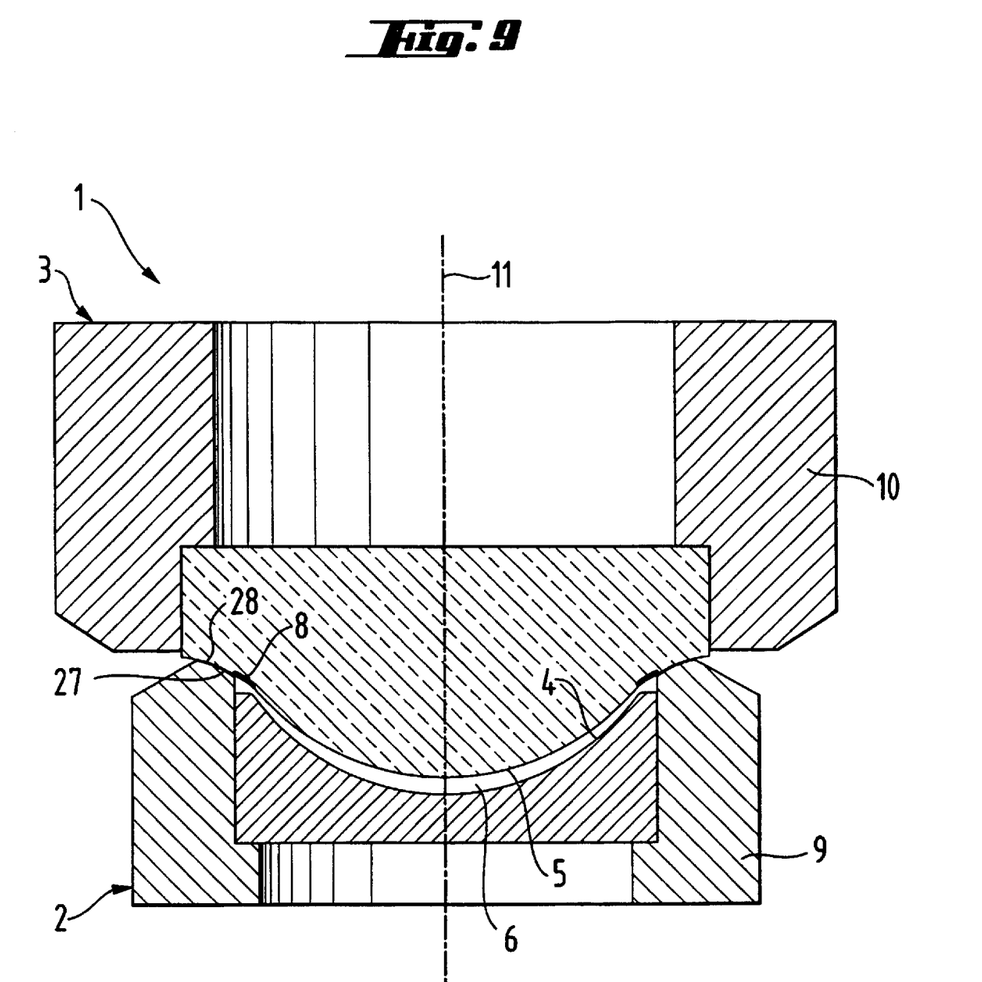
FIG. 9 shows a section according to FIG. 8 in the closed position.

In a further exemplary embodiment, illustrated in FIGS. 8 and 9, of a mould 1 comprising the female mould half 2 and the male mould half 3, the shaping surface 5 that is embedded in the mount 10 of the male mould half 3 itself forms a guide surface 27 in the region of its mould wall 5a, which adjoins the chromium mask 8. In its end region facing the male mould half 3, the mount 9 of the female mould half 2 is provided with a bevel 28, so that when the male mould half 3 and the female mould half 2 are being joined together, the guide surface 27 touches the bevel 28. Of course, it is also possible within the context of the invention for the mount 10 of the male mould half 3 to have a bevel 28 and for the shaping surface 4 of the female mould 2 to be designed in such a way that it has a guide surface in its marginal region 4a. When the mould is being closed, the male mould 3 is placed, in the region of its guide surface 27, without force onto the bevel 28 of the female mould half 2, provision being made either for the bevel 28 and guide surface 27 to interengage with an accurate fit or for there to be only a linear or point-like contact. The centring of the two mould halves 2, 3 in relation to each other is provided by the highly precise and accurately fitting production of guide surface 27 and bevel 28. The axial spacing between the two mould halves 2, 3, by which the central thickness of the contact lens produced is defined, is determined by the position of the shaping surfaces 4, 5 in the mounts 9, 10. Provided for this purpose is a device (not illustrated here) with which, advantageously, the shaping surfaces 4, 5 are embedded in the mounts 9, 10. Furthermore, a positive connection without force is also made possible here, since the two mould halves 2, 3 are placed one above the other without any pressure loading. The centring and guidance of the two mould halves 2, 3 when the mould is being closed is thus provided by the bevel 28, which is produced with extremely high precision, and the design of the shaping surface 5a, which serves as a guide surface 27. Since the mount 10 of the male mould half 2 in this case does not form a guide surface, and the mould surface 5 is already produced in a highly precise manner, it is possible for a cost reduction in production terms and, at the same time, simple handling of the closing operation, to be achieved with this embodiment, since the male mould half 3 is simply placed onto the female mould half 2. Since the bevel 28 and the guide surface 27 are of rotationally symmetrical design, it is also made possible here to rotate the two mould halves 2, 3 in relation to each other when the mould is being opened, by which means the adhesion forces with which the lenses adhere to the mould halves can be overcome more easily, and thus the risk of crack formation in the contact lenses as a result of stressing during the opening operation can be reduced.

Within the context of the invention, it is both conceivable and possible to use further embodiments of individual half guides. It is thus possible, for example, for thought to be given to centring the two individual mould halves by means of a V groove, the V groove then forming, in the closed position, a tangent to the cylindrical outer mounts of the individual mould halves.

In order to achieve the most efficient production of contact lenses using the mould according to the invention, it is expedient to combine a number of n moulds to form a modularly constructed unit, and to carry out the respective process step in parallel on the n moulds.

In the process for producing contact lenses using the inventive device, in a first process step a polymer solution is dispensed into the female mould half 2. The polymer solution considered here is specifically prepolymers, in particular those based on polyvinyl alcohol which contain cyclic acetal groups and crosslinkable groups. By positioning the male mould half 3 precisely above the female mould half 2, a mould cavity 6 corresponding to the desired contact lens shape is formed and is filled with the polymer solution. After this, the crosslinking of the polymer solution is carried out by irradiation with UV light via one mould half. The contact lenses obtained in this case are so-called soft lenses, which have little dimensional stability, as a result of their high water content. The diameter of the lenses is about 14 mm and the central thickness typically 0.1 mm.

The individual workstations at which the individual process steps are carried out are advantageously linked together by a transport system to form a production plant. The transport of the moulds between the stations takes place in parallel, while other moulds are being processed at fixed stations.

In detail, the production of the contact lenses essentially comprises the following, cyclically repetitive, process steps:

Metering: Firstly, the liquid polymer solution is metered into the female mould half 2. The male mould half 3 is then placed onto the female mould half 2 by means of a specific handling system (e.g. a Cartesian robot). However, it is also conceivable to inject the polymer solution into the laterally open mould cavity 6. Metering is preferably carried out by means of a metering needle at room temperature, the metered volume being 25–40 mg. In order to avoid the polymer solution drying out, the metering should be carried out at an increased air humidity of advantageously 60%. During the metering, the transfer of drops into the female mould half 3 should be carried out with a positioning accuracy of the metering needle of preferably ±0.5 mm (x,y planes, height). The metering needle can expediently be moved towards the mould half 2 with an adjustable distance/time profile, and is to be removed again after the end of metering. The typical metering time should advantageously be 1 s. The metering can also take place at a separate station, from which the filled and closed moulds are then introduced into the production line. Furthermore, it is also conceivable to bring the individual moulds up to the metering needle.

Closing: The positioning of the two mould halves 2,3 in relation to each other should expediently be carried out with an accuracy of better than 5 $\mu$m. This positioning should then advantageously be maintained to the end of the crosslinking. The required accuracy can be abandoned at the latest when the moulds are opened.

The time interval between the end of metering and reaching the end position of the two mould halves should advantageously be less than 5 s. This short time interval makes it possible, in particular, also to avoid undesired side effects, which can occur if the polymer solution is exposed to uncontrolled environmental conditions.

The positioning of the two mould halves 2,3 in relation to each other should likewise advantageously be carried out in accordance with a freely predefinable and controllable distance/time profile. In this case, it is in particular the movement of the two mould halves 2,3 in relation to each other in the z direction which has particular significance from the point of view of the contact lens quality. Since the forces that occur during the positioning of the two mould halves 2,3 and which are brought about by the viscosity of the polymer solution are relatively small, no large drive units are necessary. In particular, it is expedient for at least one of the two mould halves 2,3 to be arranged to be rotatable, in order to be able to position the two mould halves 2,3 at different angles in relation to each other.

Crosslinking: For the purpose of crosslinking, the closed mould is transported to an irradiation device. If a plurality of individual moulds are combined to form one unit of n moulds, it is then possible for all the n moulds to be irradiated simultaneously during transport by means of a parallel arrangement of the irradiation devices.

The UV crosslinking of the polymer solution is expediently carried out by means of irradiation with UV light (wavelength range 290 nm–330 nm), through the male mould half 3 into the mould cavity 6. The intensity of the UV radiation in the wavelength range indicated is advantageously about 2.5 mW/cm$^2$. No special requirements have to be placed on the parallelity of the UV radiation. The UV radiation can be generated by a medium-pressure mercury lamp and injected into the moulds by a specific optical system.

After the UV crosslinking, the lens material within the lens diameter has solidified to such an extent that any approach of the two mould halves 2,3 to each other as a result of the dead weight of the mould is ruled out.

Opening: After the crosslinking, there is still uncrosslinked polymer solution outside the lens diameter. The lenses themselves adhere to one of the two mould halves 2,3 with an adhesion force which is between 60 N and 120 N. Since the moulds are guided individually and are each opened individually, they can be rotated further in relation to each other before being opened. This makes a peeling process possible, by which means the adhesion forces can be overcome more easily, and thus the forces during the opening of the moulds are reduced. It is assumed that the lenses are stressed less by this, and thus crack formation can be reduced. The opening of the moulds should expediently be carried out without tilting over the first 1–2 mm, in order to avoid any contact between the two mould halves 2,3. The opening movement should preferably take place in accordance with a freely predefinable distance/time profile, irrespective of the adhesion forces.

In principle, it is also conceivable to remove the uncrosslinked prepolymer in a rining operation before the mould halves 2,3 are opened. An appropriately adapted configuration of the mount of the moulds is necessary for this.

Rinsing, initial loosening: The lenses adhering to the mould halves are expediently firstly rinsed, so that the uncrosslinked polymer solution can be removed. After this, the initial loosening of the lenses is preferably carried out using a specific loosening system.

Transferring: Since not all the lenses adhere to the female mould surface 2 following crosslinking, it is advantageous to transfer the contact lenses adhering to the male mould halves 3 into the female mould halves 2 or another specific transport container. This makes it possible to lead the corresponding mould halves to a cleaning station as early as after this process step.

Checking the contact lens: Following crosslinking, the lenses have to be checked for cosmetic faults, i.e. to see whether there are marginal fractures, cracks at the margin and in the rest of the lens material, bubbles or cavities in the lens, surface faults such as scratches, deposits or irregularities or whether there are inclusions in the lenses. Advantageously, the checking of the lenses is performed in a liquid, such as in the storage solution for the lenses. This checking can in principle take place in the package before the latter is sealed, or in an intermediate container.

Removal: The removal of the lenses is preferably carried out using a gripping device. As a result of using individual mould halves, it is preferably possible to dispense with the movement of the gripping device towards the individual mould halves, since the individual mould halves can be transported to the grippers. This means that a complicated gripper design can be avoided.

Transferring the contact lens into the package: Following the removal of the contact lens from the female mould half 2 or from the intermediate containers, the checked lens is deposited in a package. Since contact lenses with very different dioptric powers can be produced in parallel, the respective package has to be identified via an appropriate control system.

In principle, the removal of empty packages or the sorting of the lenses can be carried out in accordance with the peak refractive index following the transfer to the package. It is therefore also possible to decouple lens production and packaging via a suitable buffer section. In order to avoid the lenses drying out in this region, it is merely necessary to provide a moist atmosphere.

Cleaning: The cleaning station can advantageously be reduced to a water nozzle. The cleaning of the moulds is expediently carried out by rinsing with water at room temperature and subsequent drying by blowing off with cleaned and dried air. In principle, higher temperatures up to about 70° C. can be applied for a short time. It is not absolutely necessary to use specific cleaning agents. The cleaning and drying of the moulds should preferably be restricted to the actual functional region of the moulds and to the front surface of the mount.

Following cleaning and dying, the moulds are available again for a new production cycle. A precondition for this is that the moulds each have a defined initial state. In particular, there must be no residues of the lens material or of the rinsing liquid on the surface of the moulds. Organic contaminants (oil, etc.) and other foreign particles (dust, fluff, rust) should likewise be avoided. The cleaning and drying of the female and male moulds can take place in separate circuits and also at times different from each other, by which means the plant design may be optimized.

Packaging the lens: During the packaging of the lenses, the individual lenses are firstly deposited into an advantageously injection-moulded polypropylene shell, the package is then filled with a defined volume of a storage solution for the lenses, and the PP shells are then sealed with a foil. The critical factor in the primary packaging is the leaktightness of the packaging. In particular, the packaging must be absolutely free of germs.

The use of single mould-half alignment makes it possible for the process sequence for producing contact lenses to be configured in such a way that comprehensive adjustment work is necessary neither during operation nor during maintenance. In particular, it is possible for significant process steps, such as the mounting of individual mould halves, the monitoring of mould halves, the installation of moulds, the changing of individual mould halves and the cleaning of mould halves to be automated.

What is claimed is:

1. A process for producing a multiplicity of contact lenses from a starting material which can be crosslinked by applying suitable energy, the process comprising the steps of:

(a) providing a unit having a plurality of individual reusable moulds, wherein each mould has a female mould half, a male mould half, wherein the female and male mould halves, independently of each other, include one or more guide surfaces, wherein the guide surfaces of the female and male mould halves provide centering and adjusting elements which are all necessary for substantially accurate and automatic centering/positioning of the female and male mould halves in relation to each other in each individual reusable mould, without additional adjustment work, when the female and male mould are joined to form a mould cavity defining the shape of a contact lens to be produced;

(b) Metering the starting material into the female mould halves;

(c) Simultaneously closing the individual moulds to join the male mould halves to the female mould halves to form mould cavities containing the starting material and at the same time to individually and automatically perform, by means of the guided surfaces of the female and male mould halves of each individual mould, accurate alignment of the female and male mould halves of each of the individual moulds;

(d) Applying energy to crosslink and/or polymerize the starting material within the mould cavities in order to produce the contact lenses;

(e) Separating the male mould halves from the female mould halves;

(f) Washing the contact lenses to remove uncrosslinked starting material;

(g) Ensuring that the contact lenses are resting on selected mould halves;

(h) Checking whether the contact lenses are free of faults;

(i) Gripping the contact lenses in order to remove the contact lenses from the selected mould halves;

(j) Depositing each fault-free contact lens into a package;

(k) Cleaning and drying the female and the male mould halves;

(l) Bringing the female and male mould halves into a position for metering the starting material; and (m) cyclically repeating steps (b) to (l).

2. A process according to claim 1, wherein the energy used to effect crosslinking is radiation energy.

3. A process according to claim 1, wherein the energy effecting the crosslinking is physically limited to the region of the mould cavity.

4. A process according to claim 1, wherein the application of energy is physically limited by a masking means for the mould which is at least partly nontransparent to the energy effecting the crosslinking.

5. A process according to claim 1, wherein one or more of the female or male mould halves are very transparent to the energy effecting the crosslinking, and wherein the application of energy is physically limited by parts of the female and/or male mould halves which are poorly transparent or nontransparent to the energy effecting the crosslinking.

6. A process according to claim 1, wherein the application of energy is physically limited by a mask which is provided outside the mould cavity, on or in the female or male mould half, and is poorly transparent or nontransparent to the energy effecting the crosslinking.

7. A process according to claim 6, wherein the mask is arranged in the region of dividing planes or dividing surfaces of the male or female mould half.

8. A process according to claim 1, wherein the application of energy is physically limited by limiting the beam path outside the mould.

9. A process according to claim 1, wherein, after the material has been introduced into the female mould half and the two mould halves have been closed, a gap remains open, said gap being connected to the mould cavity, and wherein the energy effecting the crosslinking is kept away from the material in this gap.

10. A process according to claim 1, wherein the mould is closed without force, so that the female and male mould halves rest on each other only by their dead weight and without external loading.

11. A process according to claim 1, wherein the two mould halves are closed by means of a mechanical device.

12. A process according to claim 1, wherein the starting material is a prepolymer which is a derivative of a polyvinyl alcohol with a molecular weight of at least 2000 Da, and contains from about 0.5% to about 80% units of the formula I, based on the number of hydroxyl groups in the polyvinyl alcohol:

(I)

where R is lower alkylene with up to 8 carbon atoms, $R^1$ is hydrogen or lower alkyl and $R^2$ is an olefinically unsaturated, electron-withdrawing copolymerizable radical.

13. A process according to claim 1, wherein at least visual quality inspection of the contact lenses is provided, the inspection comprising the examination of a central region of each contact lens and of a marginal region of the contact lens for faults.

14. A process according to claim 1, which comprises centering each contact lens within a female mould half before the contact lens is gripped in order to remove it from the female mould half.

15. A process according to claim 1, which comprises at least partial drying of each contact lens in order to remove surface water, which could impair the visual inspection of the contact lens.

16. A process according to claim 13, wherein the visual inspection of the central region of each contact lens is carried out immediately after the energy for crosslinking or polymerization of the starting material has been applied.

17. A process according to claim 13, wherein the visual inspection of each entire contact lens is carried out in an intermediate container filled with a liquid.

18. A process according to claim 1, wherein the duration of each process step is less than one minute.

19. A process according to claim 1, wherein the duration for at least one process step is less than 10 seconds.

20. A process according to claim 1, wherein the process step of ensuring that the contact lenses are resting on selected mould halves also comprises transferring the contact lenses from the non-selected mould halves to the appropriate selected mould halves.

21. A process according to claim 20, wherein the selected mould halves are the female mould halves and the non-selected mould halves are the male mould halves.

22. A process according to claim 1, wherein the mould halves are reused and at least 10,000 contact lenses are produced with them.

23. A process according to claim 1, wherein the mould halves are reused and at least 500,000 contact lenses are produced with them.

24. A device for producing contact lenses, comprising a plurality of individual reusable moulds, wherein each mould has a female mould half, a male mould half, wherein the female and male mould halves, independently of each other, include one or more guide surfaces, wherein the guide surfaces of the female and male mould halves provide centering and adjusting elements which are all necessary for substantially accurate and automatic centering/positioning of the female and male mould halves in relation to each other in each individual reusable mould, without additional adjustment work, when the female and male mould are joined to form a mould cavity defining the shape of a contact lens to be produced, wherein each mould is intended to accommodate a crosslinkable material and is designed to be at least partly transparent to energy which is supplied from outside and effects the crosslinking of the crosslinkable material, wherein the plurality of the individual reusable moulds are combined into a unit for transporting and for closing the individual moulds simultaneously, and wherein accurate alignments of the female mould halves and the male mould halves of each individual mould is individually and automatically performed by means of the guide surfaces of the female and male mould halves of each individual mould when the moulds are closed simultaneously.

25. A device as claimed in claim 24, wherein the female and the male mould halves are separated along a dividing surface, and a mask which is nontransparent or poorly transparent to the energy effecting the crosslinking is provided on the male and/or female mould half outside of the mould cavity in the region of the dividing surface.

26. A device according to claim 24, wherein the male female mould half consists of UV-transparent material.

27. A device according to claim 24, wherein the female mould half consists of non-UV-transparent material.

28. A device according to claim 25, wherein the mask consists of a layer of a material that is not transparent to UV radiation.

29. A device according to claim 25, wherein the mould has a gap which encloses the mould cavity and is connected to the latter, and wherein the mask is arranged in the region of the gap.

30. A device according to claim 24, wherein the accuracy of the distance between the female mould half and the male mould half is in the range of $\leq 10\ \mu m$.

31. A device according to claim 24, wherein the accuracy of the distance between the female mould half and the male mould half is in the range of $\leq 5\ \mu m$.

32. A device according to claim 24, wherein the accuracy of centering the axis of the female mould half in relation to the male mould half is $\leq 10\ \mu m$.

33. A device according to claim 24, wherein the accuracy of centering the axis of the female mould half in relation to the male mould half is $\leq 5\ \mu m$.

34. A device according to claim 24, wherein the tilt error of the two mould halves in relation to each other in the direction of the optical axis of the female or male mould half is $\leq 10\ \mu M$.

35. A device, according to claim 24, wherein the tilt error of the two mould halves in relation to each other in the direction of the optical axis of the female or male mould half is $\leq 5\ \mu m$.

36. A device according to claim 24, wherein the male and female mould halves each have a shaping surface, and wherein the female and the male mould halves each have an outer mount into which the shaping surface is embedded.

37. A device according to claim 36, wherein the outer mount of the respective mould half comprises guide surfaces, which are used to centre the female and male mould halves in relation to each other.

38. A device according to claim 36, wherein the outer mount of one of the male or the female mould half is provided with a web having a front surface and a cylindrical outer surface, and wherein further in the region of the dividing surface the outer mount of the other mould half is provided with a groove having a front surface and a cylindrical outer surface, the web of the one of the male or female mould half and the groove of the other of the male or female mould half being arranged such, that upon closing of the mould halves the web engages the groove and the cylindrical outer surfaces and front surfaces of the web and the groove serve as guide surfaces for centering the male and female mould halves.

39. A device according to claim 36, wherein a cylindrical centering device is provided on the inside with guide surfaces having an inner diameter, and wherein the outer mounts of the female mould half and the male mould half are provided with outer guide surfaces having an outer diameter corresponding to the inner diameter of the centering device, so that the male and female mould halves can be inserted into the centering device while being centered during insertion.

40. A device according to claim 39, wherein the centering device is firmly connected to the male mould half.

41. A device according to claim 36, wherein the outer mount of one of the male mould half or female mould half has a conical outer surface tapering conically towards the embedded shaping surface of the respectively corresponding mould half, and wherein the outer mount of the other mould half has an inner surface which is designed as a conical funnel narrowing towards the embedded shaping surface of the respective other mould half, the conical outer surface of the one mould half and the funnel-shaped inner surface of the other mould half being arranged such that upon closing the mould halves the conical outer surface of the one mould half engages the funnel-shaped inner surface of the other mould half thereby centering the male and female mould halves.

42. A device according to claim 41, wherein upon closing the mould the outer mounts of the two mould halves touch only on the funnel-shaped inner surface and on the conical outer surface.

43. A device according to claim 36, wherein the shaping surface of one of the female mould half or the male mould half has a bevel in a marginal region, the bevel defining a guide surface, and wherein the outer mount of the other mould half is provided with a corresponding guide surface being arranged such that upon closing the mould halves the bevel and the guide surface of the mount engage thereby centering the male and female mould halves.

44. A device according to claim 36, wherein the shaping surface consists of glass.

* * * * *